(12) United States Patent
Chuang et al.

(10) Patent No.: US 11,952,079 B2
(45) Date of Patent: Apr. 9, 2024

(54) METHOD FOR CONTROLLING DERAILLEUR IN LOW BATTERY REMAINING CAPACITY

(71) Applicant: TEKTRO TECHNOLOGY CORPORATION, Changhua County (TW)

(72) Inventors: Hsun-Yu Chuang, Changhua County (TW); Hung-Jui Lin, Changhua County (TW); I-Chun Liao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 608 days.

(21) Appl. No.: 17/158,270

(22) Filed: Jan. 26, 2021

(65) Prior Publication Data

US 2021/0245835 A1     Aug. 12, 2021

(30) Foreign Application Priority Data

Feb. 6, 2020   (TW) ................... 109103670

(51) Int. Cl.
*B62M 9/122*  (2010.01)
*B62J 43/10*  (2020.01)
*B62J 45/41*  (2020.01)
*B62M 9/12*   (2006.01)

(52) U.S. Cl.
CPC ............. *B62M 9/12* (2013.01); *B62J 43/10* (2020.02); *B62J 45/41* (2020.02); *B60L 2200/12* (2013.01)

(58) Field of Classification Search
CPC ........ B62M 9/12; B62M 9/132; B62M 25/08; B62M 9/122; B62M 25/04; B62J 43/10; B62J 45/41; B62J 43/30; B62J 45/00; B60L 2200/12; B62K 23/02
See application file for complete search history.

(56) References Cited

U.S. PATENT DOCUMENTS

2020/0223513 A1* 7/2020 Ho ................... B62J 45/41
2020/0377167 A1* 12/2020 Suzuki ............. B62M 6/45

FOREIGN PATENT DOCUMENTS

EP       2927108 A1 * 10/2015 ........... B62K 23/06
JP       3573723 B2 * 10/2004 ........... B62M 25/08
JP    2005297655 A  * 10/2005 ........... B62K 23/06

* cited by examiner

*Primary Examiner* — Justin Holmes
(74) *Attorney, Agent, or Firm* — Locke Lord LLP; Tim Tingkang Xia, Esq.

(57) ABSTRACT

A method for controlling a derailleur in low battery remaining capacity includes determining whether a remaining capacity of a first battery of the derailleur is smaller than or equal to a first derailleur battery threshold. When the remaining capacity of the first battery is determined to be smaller than or equal to the first derailleur battery threshold, at least one of gear positions of the derailleur is invalided and non-selectable by the derailleur.

14 Claims, 4 Drawing Sheets

METHOD FOR CONTROLLING DERAILLEUR IN LOW BATTERY REMAINING CAPACITY

CROSS-REFERENCE TO RELATED APPLICATIONS

This non-provisional application claims priority under 35 U.S.C. § 119(a) on patent application No(s). 109103670 filed in Taiwan, R.O.C. on Feb. 6, 2020, the entire contents of which are hereby incorporated by reference.

TECHNICAL FIELD

The disclosure relates to a method for controlling a device in low battery remaining capacity, more particularly to a method for controlling a derailleur in low battery remaining capacity.

BACKGROUND

In general, a bicycle equips a front derailleur and a rear derailleur. The front and rear derailleurs can move a bicycle chain among chain rings of a front chain ring assembly and sprockets of a rear cassette to adjust a gear ratio.

The front and rear derailleurs can be driven by a cable or electricity. To the electricity-driven derailleur (e.g., the rear derailleur), after a shift lever transmits shift signal to the derailleur, a motor inside the derailleur drive a chain guide of the derailleur via a transmission assembly to move the bicycle chain from one of the sprockets to another. Batteries are used to provide electricity to the brake lever and the motor of the derailleur for their operation. However, it is difficult to know the remaining capacities of the batteries. Sometimes the replacements of the batteries depend on the failure of the shifting the gear position of the derailleur since the depleted batteries or the batteries of insufficient remaining capacities are unable to allow the derailleur to move the chain ring. At this situation, the derailleur may be in a high gear that requires high-load pedaling; that is, the bicycle chain may be located at the smallest sprockets of the rear cassette or the largest chain ring of the front chain ring assembly. As a result, the rider still pedals in great effort and cannot save strength by shifting the gear position of the derailleur. Therefore, the bicycle manufacturer is working on solving the above problems.

SUMMARY

The disclosure provides a method for controlling a derailleur in low battery remaining capacity that is capable of preventing the derailleur from shifting to high gear when the battery's remaining capacity is low.

One embodiment of the disclosure provides a method for controlling a derailleur in low battery remaining capacity. The method includes determining whether a remaining capacity of a first battery of the derailleur is smaller than or equal to a first derailleur battery threshold. When the remaining capacity of the first battery is determined to be smaller than or equal to the first derailleur battery threshold, at least one of gear positions of the derailleur is invalided and non-selectable by the derailleur.

Another embodiment of the disclosure provides a method for controlling a derailleur in low battery remaining capacity. The method includes determining whether a remaining capacity of a battery of a shift lever is smaller than or equal to a first lever battery threshold. When the remaining capacity of the battery is determined to be smaller than or equal to the first lever battery threshold, at least one of gear positions of the derailleur is invalided and non-selectable by the derailleur.

Still another embodiment of the disclosure provides a method for controlling a derailleur in low battery remaining capacity. The method includes determining whether a remaining capacity of a first battery of a derailleur is smaller than or equal to a first derailleur battery threshold, and determining whether a remaining capacity of a second battery of a shift lever is smaller than or equal to a first lever battery threshold. When the remaining capacity of the first battery is smaller than or equal to the first derailleur battery threshold, or the remaining capacity of the second battery is smaller than or equal to the first lever battery threshold, the shift lever does not send a gear shifting signal to the derailleur, or the derailleur is unresponsive to the gear shifting signal sent by the shift lever.

According to the methods for controlling a derailleur in low battery remaining capacity discussed in the above embodiments of the disclosure, when the remaining capacity of the first battery is smaller than or equal to the first derailleur battery threshold, or the remaining capacity of the second battery is smaller than or equal to the first lever battery threshold, the highest gear may be the gear position that is not allowed to be selected. As such, it can prevent the derailleur from shifting to the highest gear when the remaining capacity of the first battery is about to be insufficient for gear shifting or the remaining capacity of the second battery is about to be insufficient for signal transmission. As a result, even if the remaining capacity of the first battery or the second battery drops to a lower level, the rider is prevented from selecting the highest gear, thus avoiding the situation of high-load pedaling.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
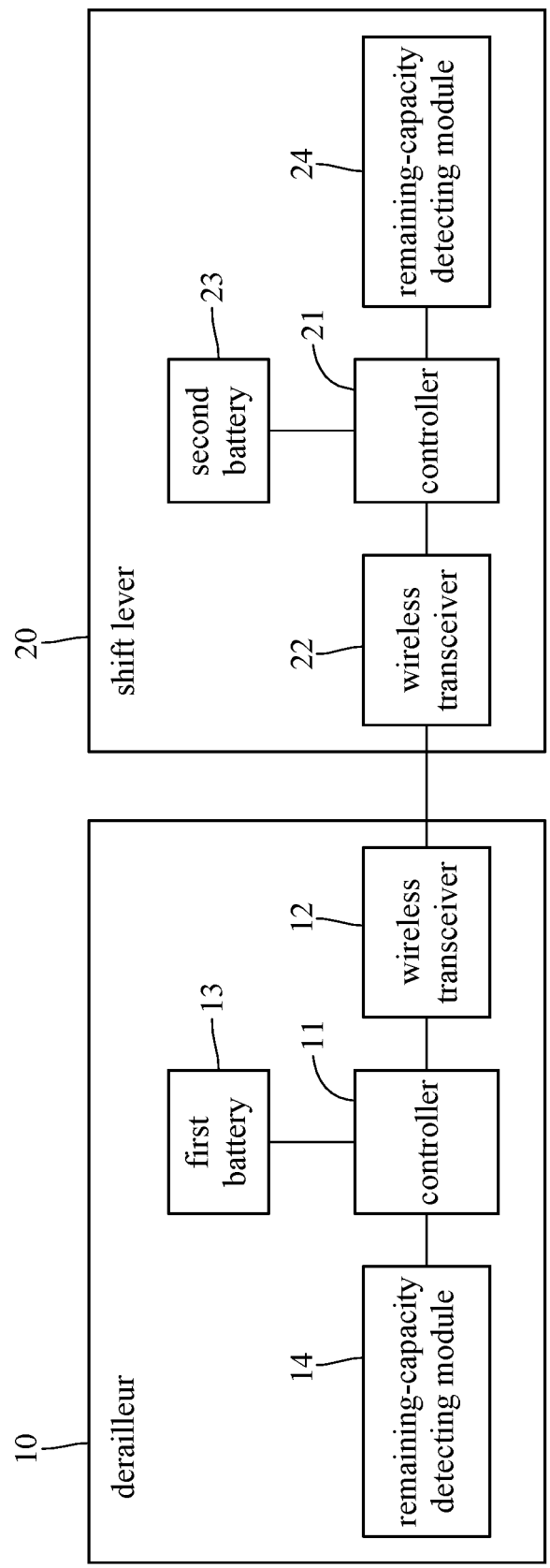
FIG. 1 is a block diagram of a system containing a shift lever and a derailleur that can cooperate to perform a method for controlling the derailleur in a low battery remaining capacity according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, there is shown a block diagram of a system that contains a shift lever 20 and a derailleur 10 that can cooperate to perform a derailleur control method according to a first embodiment of the disclosure. In this embodiment, the derailleur 10 is, for example, a bicycle rear derailleur, and the shift lever 20 is, for example, a bicycle right shift lever.

The derailleur 10, for example, has a controller 11, a wireless transceiver 12, a first battery 13, and a remaining-capacity detecting module 14. The wireless transceiver 12, the first battery 13, and the remaining-capacity detecting module 14 are electrically connected to the controller 11. The wireless transceiver 12 can receive and transmit signal wirelessly. The first battery 13 can provides electricity to the wireless transceiver 12. The remaining-capacity detecting module 14 can detect the remaining capacity of the first battery 13.

In this embodiment, a first derailleur battery threshold and a second derailleur battery threshold are defined to determine the level of the remaining capacity of the first battery 13, where the first derailleur battery threshold denotes a number or a value greater than that of the second derailleur battery threshold. Generally, a battery's voltage level will continuously drop during discharge, thus the higher the remaining capacity of the battery, the higher the voltage level of the battery. In this regards, Table 1, as given below, uses the voltage level of the first battery 13 to reflect the remaining capacity of the first battery 13. In specific, In Table 1, when the voltage of the first battery 13 is measured to be approximately 8.4V, the first battery 13 can be considered as to be in full capacity; when the voltage of the first battery 13 drops to 7.7V, the remaining capacity of the first battery 13 is determined to reach the first derailleur battery threshold; when the voltage of the first battery 13 drops to 7.4V, the remaining capacity of the first battery 13 is determined to reach the second derailleur battery threshold; when the voltage of the first battery 13 drops to 6V, the remaining capacity of the first battery 13 can be considered to be insufficient for the operation of the derailleur 10.

TABLE 1

| Remaining capacity of the first battery 13 | Voltages of the first battery 13 |
|---|---|
| full | 8.4 V |
| first derailleur battery threshold | 7.7 V |
| second derailleur battery threshold | 7.4 V |
| insufficient | 6 V |

Note:
the remaining capacity of the first battery 13 is reflected by the voltage level of the first battery 13.

In this embodiment, the derailleur 10 is able to move a chain (not shown) among multiple sprockets of different sizes to achieve transition among high to low gears. The "highest" gear is achieved by combining the largest chain ring in the front and the smallest sprocket in the rear, in this position, the rider is allowed to achieve high speeds without over-revving. The "lowest" gear is the smallest chain ring in the front and the largest sprocket in the rear, in this position, the pedaling will be the easiest so that the rider will be able to pedal uphill with the smallest amount of resistance, that is, the low gear allows rider to travel at a steep hill without high-load pedaling. In short, the force required for a single pedaling during high gear is greater than that is required during low gear.

The shift lever 20, for example, has a controller 21, a wireless transceiver 22, a second battery 23, and a remaining-capacity detecting module 24. The wireless transceiver 22, the second battery 23, and the remaining-capacity detecting module 24 are electrically connected to the controller 21. The wireless transceiver 22 can transmit the signal (e.g., a gear shifting signal) to the wireless transceiver 12 of the derailleur 10 wirelessly. The second battery 23 can provides electricity to the wireless transceiver 22. The remaining-capacity detecting module 24 can detect the remaining capacity of the second battery 23.

In this embodiment, a first lever battery threshold and a second lever battery threshold are defined to determine the level of the remaining capacity of the second battery 23, where the first lever battery threshold denotes a number or a value greater than the second lever battery threshold. Generally, a battery's voltage level will continuously drop during discharge, thus the higher the remaining capacity of the battery, the higher the voltage level of the battery. In this regards, Table 2, as given below, uses the voltage level of the second battery 23 to reflect the remaining capacity of the second battery 23. In specific, in Table 2, when the voltage of the second battery 23 is measured to be approximately 3.2 volts, the second battery 23 can be considered as to be in full capacity; when the voltage of the second battery 23 drops to 2.8V, the remaining capacity of the second battery 23 is determined to reach the first lever battery threshold; when the voltage of the second battery 23 drops to 2.5V, the remaining capacity of the second battery 23 is determined to reach the second lever battery threshold; when the voltage of the second battery 23 drops to 2V, the remaining capacity of the second battery 23 can be considered to be insufficient for the operation of the shift lever 20.

TABLE 2

| Remaining capacity of the second battery 23 | Voltages of the second battery 23 |
|---|---|
| full | 3.2 V |
| first lever battery threshold | 2.8 V |
| second lever battery threshold | 2.5 V |
| insufficient | 2 V |

Note:
the remaining capacity of the second battery 23 is reflected by the voltage level of the second battery 23.

Figure 2:
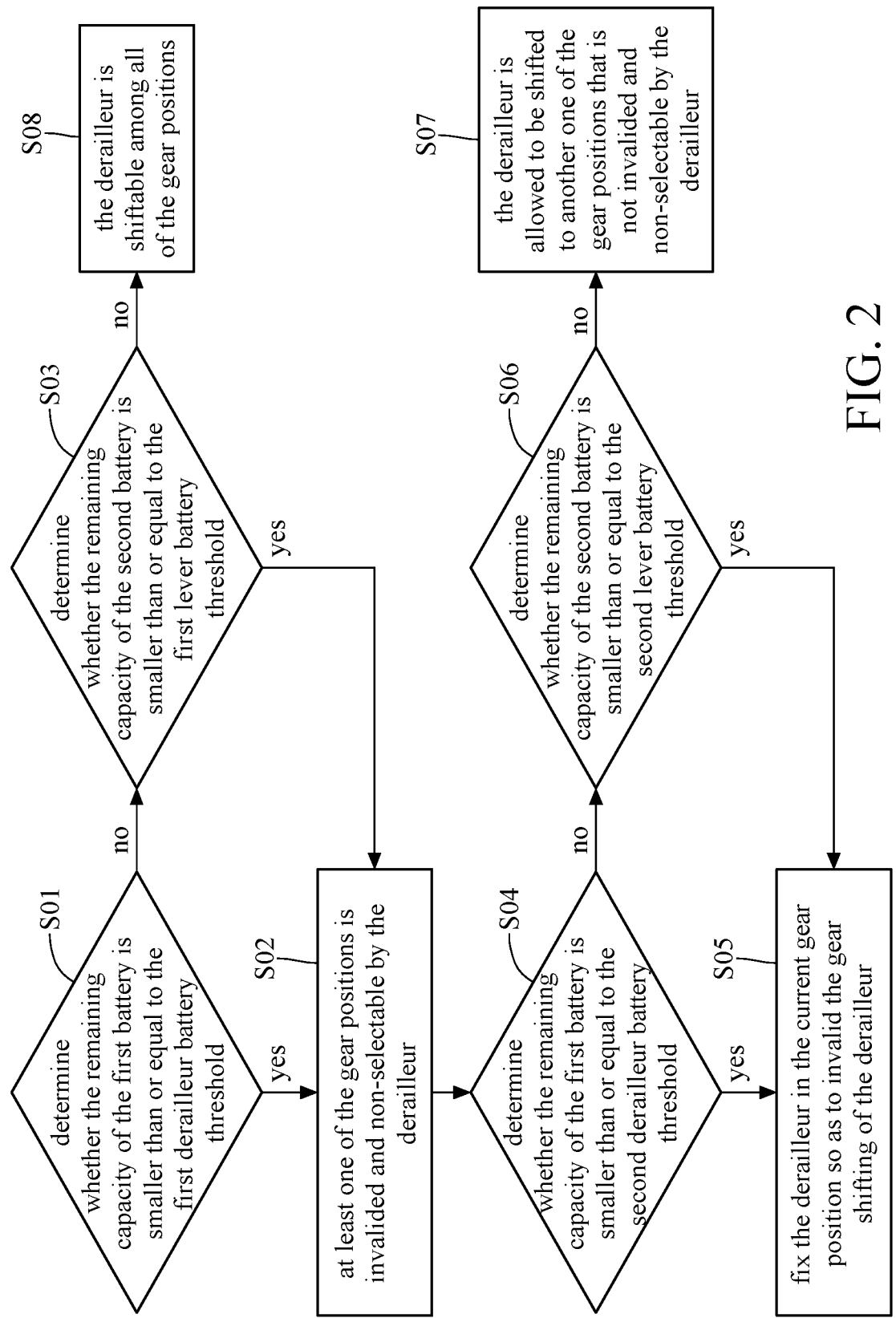
FIG. 2 is a flow chart of a method for controlling the derailleur in a low battery remaining capacity according to the first embodiment of the disclosure.

Then, referring to FIG. 2, there is shown a flow chart of a method for controlling the derailleur 10 in low battery remaining capacity according to the first embodiment of the disclosure.

Firstly, step S01 is to determine whether the remaining capacity of the first battery 13 is smaller than or equal to the first derailleur battery threshold. When the remaining capacity of the first battery 13 is determined to be smaller than or equal to the first derailleur battery threshold, step S02 is performed. In step S02, at least one of the gear positions is invalided and non-selectable by the derailleur 10.

For example, when the remaining-capacity detecting module 14 detects that the voltage of the first battery 13 is smaller than or equal to 7.7 volts, the controller 11 of the derailleur 10 invalids the highest gear, such that the derailleur 10 is currently not allowed to select the highest gear.

On the other hand, when the remaining capacity of the first battery 13 is determined to be larger than the first derailleur battery threshold, step S03 is performed. Step S03 is to determine whether the remaining capacity of the second battery 23 is smaller than or equal to the first lever battery threshold. When the remaining capacity of the second battery 23 is determined to be smaller than or equal to the first lever battery threshold, the step S02 is performed to prevent the derailleur 10 from selecting the at least one of the gear positions.

For example, when the voltage of the first battery 13 is larger than 7.7 volts, and the remaining-capacity detecting module 24 of the shift lever 20 detects that the voltages of the second battery 23 is smaller than or equal to 2.8 volts, the controller 21 of the shift lever 20 commands the wireless transceiver 22 to transmit a signal indicating the low remaining capacity of the second battery 23 to the wireless transceiver 12 of the derailleur 10, based on this signal, then the controller 11 invalids the highest gear, such that the derailleur 10 is currently not allowed to select the highest gear.

In this embodiment, there is one or more ways for invaliding the gear position. For example, when the remaining capacity of the first battery 13 is smaller than or equal to the first derailleur battery threshold, or the remaining capacity of the second battery 23 is smaller than or equal to the first lever battery threshold, the controller 11 of the derailleur 10 will be unresponsive to the highest gear shifting signal sent from the wireless transceiver 22 of the shift lever 20, thereby preventing the derailleur 10 from selecting the highest gear. Alternatively, in the same situation, the controller 21 of the shift lever 20 will be unresponsive to the highest gear shifting by the rider; that is, the controller 21 of the shift lever 20 does not allow the wireless transceiver 22 to transmit the highest gear shifting signal to the derailleur 10.

As discussed, when the remaining capacity of the first battery 13 is smaller than or equal to the first derailleur battery threshold, or the remaining capacity of the second battery 23 is smaller than or equal to the first lever battery threshold, the highest gear is not allowed to be selected. As such, step S02 can prevent the derailleur 10 from shifting to the highest gear when the remaining capacity of the first battery 13 is about to be insufficient for gear shifting or the remaining capacity of the second battery 23 is about to be insufficient for signal transmission of the wireless transceiver 22. As a result, even if the remaining capacity of the first battery 13 or the second battery 23 drops to a lower level, the rider is prevented from selecting the highest gear, thus avoiding the situation of high-load pedaling.

After step S02, step S04 is perform. Step S04 is to determine whether the remaining capacity of the first battery 13 is smaller than or equal to the second derailleur battery threshold. When the remaining capacity of the first battery 13 is determined to be smaller than or equal to the second derailleur battery threshold, step S05 is performed. Step S05 is to fix the derailleur 10 in the current gear position so as to invalid the gear shifting of the derailleur 10. That is, in step S05, the derailleur 10 is not allowed to shift gear position.

For example, when the remaining-capacity detecting module 14 of the derailleur 10 detects that the voltage of the first battery 13 is smaller than or equal to 7.4 volts, the controller 11 of the derailleur 10 fixes the derailleur 10 in the current gear position, such that the derailleur 10 is unable to be shifted to another gear position; that is, the remaining capacity of the first battery 13 is nearly insufficient, thus fixing the derailleur 10 in the current gear position can prevent the derailleur 10 from being incompletely shifted.

In the step S04, when the remaining capacity of the first battery 13 is determined to be larger than the second derailleur battery threshold, step S06 is performed. Step S06 is to determine whether the remaining capacity of the second battery 23 is smaller than or equal to the second lever battery threshold. When the remaining capacity of the second battery 23 is determined to be smaller than or equal to the second lever battery threshold, step S05 is performed to fix the derailleur 10 in the current gear position so as to invalid the gear shifting of the derailleur 10; that is derailleur 10 is not allowed to shift gear position.

For example, when the voltage of the first battery 13 is larger than 7.4 volts, and the remaining-capacity detecting module 24 of the shift lever 20 detects that the voltage of the second battery 23 is smaller than or equal to 2.5 volts, the controller 21 of the shift lever 20 commands the wireless transceiver 22 to transmit a signal indicating lower remaining capacity of the second battery 23 to the wireless transceiver 12 of the derailleur 10. Then, the controller 11 of the derailleur 10 invalids the gear shifting of the derailleur 10 to fix the derailleur 10 in the current gear position to prevent the derailleur 10 from being shifted to another gear position.

In this embodiment, there is one or more ways for fixing the derailleur 10 in the current gear position. For example, when the remaining capacity of the first battery 13 is smaller than or equal to the second derailleur battery threshold, or the remaining capacity of the second battery 23 is smaller than or equal to the second lever battery threshold, the controller 11 of the derailleur 10 will be unresponsive to any gear shifting signal sent from the wireless transceiver 22 of the shift lever 20, thereby preventing the derailleur 10 from being shifted to another gear position. Alternately, in the same situation, the controller 21 of the shift lever 20 will be unresponsive to any gear shifting by the rider; that is, the controller 21 of the shift lever 20 does not allow the wireless transceiver 22 to transmit any gear shifting signal to the derailleur 10.

In the step S06, when the remaining capacity of the second battery 23 is determined to be larger than the second lever battery threshold, step S07 is performed. In step S07, the derailleur 10 is allowed to be shifted to another one of the gear positions that is not invalided and non-selectable by the derailleur 10. In other word, although the remaining capacities of the first battery 13 and the second battery 23 are about to be insufficient, the remaining capacity of the first battery 13 is still enough to shift the derailleur 10 to another gear position, and the remaining capacity of the second battery 23 is still enough to command the wireless transceiver 22 of the shift lever 20 to transmit the shift signal to the wireless transceiver 12 of the derailleur 10 when the remaining capacity of the first battery 13 is larger than the second derailleur battery threshold, and the remaining capacity of the second battery 23 is larger than the second lever battery threshold. Since the highest gear position is valid in the step S02, the derailleur 10 is only shiftable among the gear positions other than the highest gear position.

In the step S03, when the remaining capacity of the second battery 23 is determined to be larger than the first lever battery threshold, step S08 is performed. In step S08, the derailleur 10 is shiftable among all of the gear positions; that is, the first battery 13 and the second battery 23 still have sufficient remaining capacity to allow the derailleur to be freely shift among all gear positions.

Note that the derailleur 10 is not restricted to be the rear derailleur, and the shift lever 20 is not restricted to be the bicycle right shift lever in the disclosure; in some other embodiments, the derailleur may be a front derailleur, and the shift lever may be a bicycle left shift lever. The following paragraphs will describe such a case.

The derailleur is able to move the chain among multiple chain rings of different sizes of the front chain ring set. Each of the chain rings corresponds to at least two of the gear positions of the derailleur. Specifically, the front chain ring set has a small chain ring and a large chain ring, and the derailleur is shiftable among a first gear position, a second gear position, a third gear position, and the fourth gear position. The first gear position and the second gear position of the derailleur correspond to the small chain ring, and the shift between the first gear position and the second gear position is just a fine adjustment. Similarly, the third gear position and the fourth gear position of the derailleur correspond to the large chain ring, and the shift between the third gear position and the fourth gear position is just a fine adjustment.

When the remaining capacity of the first battery is smaller than or equal to the first derailleur battery threshold, or the remaining capacity of the second battery is smaller than or equal to the first lever battery threshold, in the step S02 of FIG. 2, the third gear position and the third gear position of the derailleur corresponding to the large chain ring are invalided. When the remaining capacity of the first battery is smaller than or equal to the second derailleur battery threshold, or the remaining capacity of the second battery is smaller than or equal to the second lever battery threshold, in the step S05 of FIG. 2, the derailleur is fixed in the current gear position to prevent the derailleur from be shifted to another gear position. In specific, when the derailleur is currently in one of the first gear position and the second gear position, the derailleur is unable to be shifted to the other. In the step S07 of FIG. 2, when the remaining capacity of the first battery is smaller than or equal to the first derailleur battery threshold and larger than the second derailleur battery threshold, and the remaining capacity of the second battery is smaller than or equal to the first lever battery threshold and larger than the second lever battery threshold, the derailleur can be freely shifted between the first gear position and the second gear position.

Note that the order of the derailleur control method is not intended to limit the disclosure; in some other embodiments, determining the relationship between the remaining capacity of the second battery 23 and the first lever battery threshold may be performed earlier than determining relationship between the remaining capacity of the first battery 13 and the first derailleur battery threshold; that is, step S03 may be performed earlier than step S01 in FIG. 2. Similarly, the step S06 may be performed earlier than the step S04 in FIG. 2.

Note that the voltages values of the first battery 13 corresponding to the first derailleur battery threshold and the second derailleur battery threshold are not intended to limit the disclosure and may be modified according to an actual requirement. Similarly, the voltages values of the second battery 23 corresponding to the first lever battery threshold and the second lever battery threshold may be also modified according to an actual requirement.

Note that the remaining capacities of the first battery 13 and the second battery 23 are not limited to be reflected by the voltages; in some other embodiments, the remaining capacities of the first battery 13 and the second battery 23 may be reflected by milliampere-hour.

On the other hand, in FIG. 1, the first battery 13 is disposed inside the derailleur 10, and the second battery 23 is disposed inside the shift lever 20, but the locations of the first battery 13 and the second battery 23 are not intended to limit the disclosure; in some other embodiments, the first battery may be disposed outside and connected to the derailleur, and the second battery may be disposed outside and connected to the shift lever.

Figure 3:
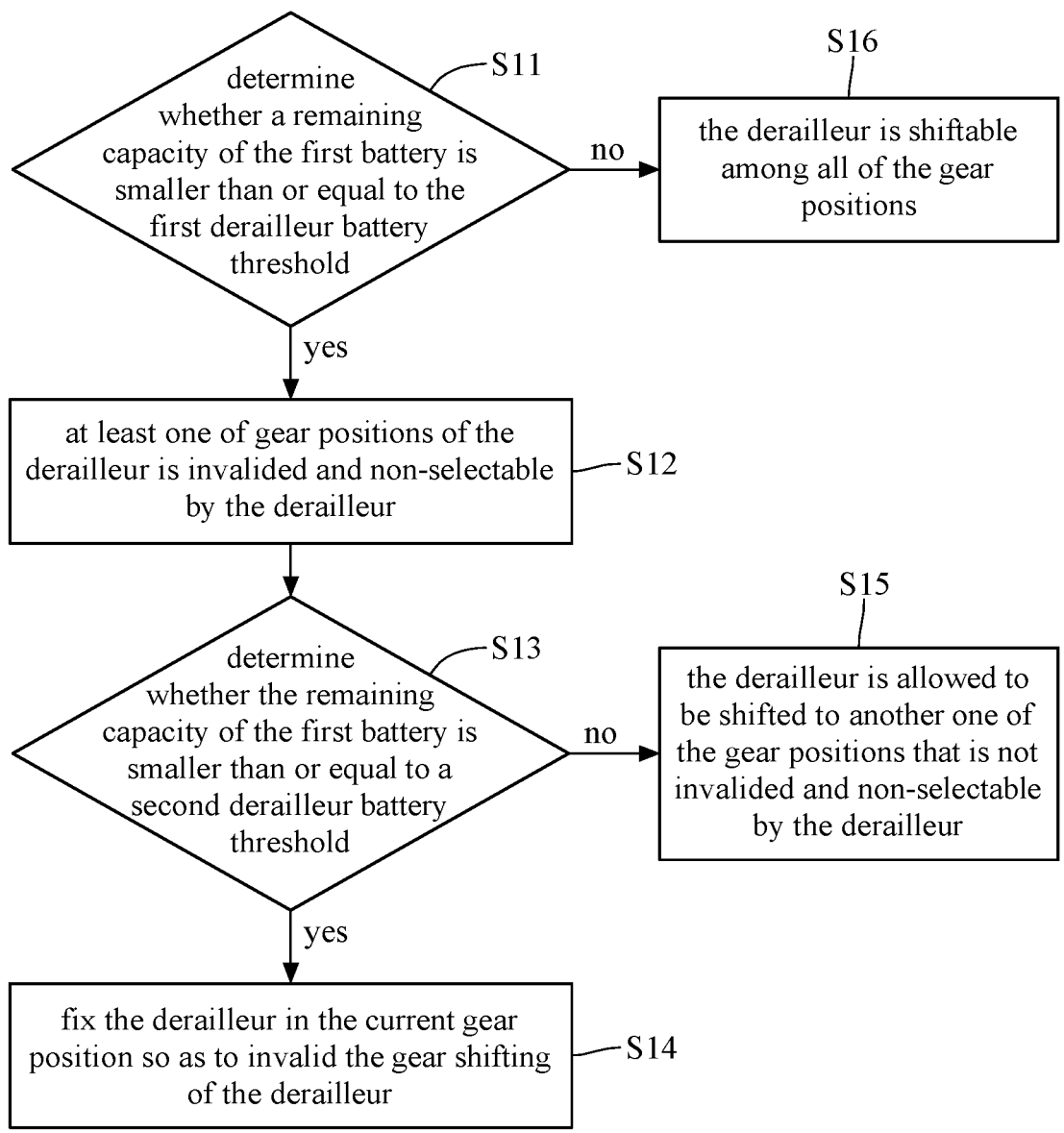
FIG. 3 is a flow chart of a method for controlling a derailleur in a low battery remaining capacity according to a second embodiment of the disclosure.

Then, referring to FIG. 3, there is shown a flow chart of a method for controlling the derailleur 10 in a low battery remaining capacity according to a second embodiment of the disclosure.

In this embodiments, step S11 of the derailleur control method is firstly performed. Step S11 is to determine whether a remaining capacity of the first battery 13 is smaller than or equal to the first derailleur battery threshold. When the remaining capacity of the first battery 13 is determined to be smaller than or equal to the first derailleur battery threshold, step S12 is performed. In step S12, at least one of gear positions of the derailleur 10 is invalided and non-selectable by the derailleur 10.

After step S12, step S13 is performed. Step S13 is to determine whether the remaining capacity of the first battery 13 is smaller than or equal to a second derailleur battery threshold. When the remaining capacity of the first battery 13 is determined to be smaller than or equal to the second derailleur battery threshold, step S14 is performed. Step S14 is to fix the derailleur 10 in the current gear position so as to invalid the gear shifting of the derailleur 10.

In the step S13, when the remaining capacity of the first battery 13 is determined to be larger than second derailleur battery threshold, step S15 is performed. In step S15, the derailleur 10 is allowed to be shifted to another one of the gear positions that is not invalided and non-selectable by the derailleur 10.

In the step S11, when the remaining capacity of the first battery 13 is determined to be larger than first derailleur battery threshold, step S16 is performed. In step S16, the derailleur 10 is shiftable among all of the gear positions.

Figure 4:
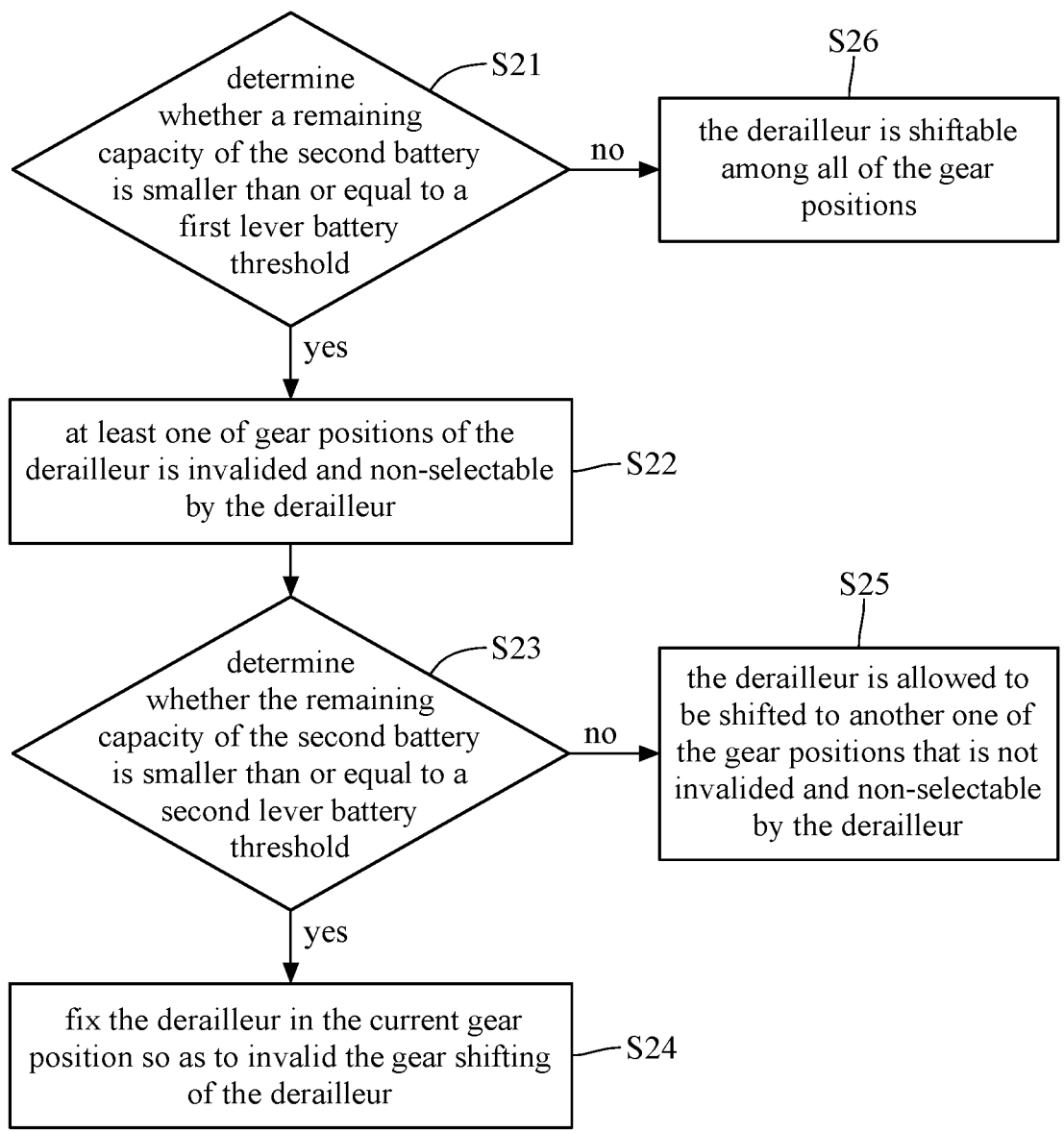
FIG. 4 is a flow chart of a method for controlling a derailleur in a low battery remaining capacity according to a third embodiment of the disclosure.

Then, referring to FIG. 4, there is shown a flow chart of a method for controlling the derailleur 10 in a low battery remaining capacity according to a third embodiment of the disclosure.

In this embodiment, step S21 is firstly performed. The step S21 is to determine whether a remaining capacity of the second battery 23 is smaller than or equal to a first lever battery threshold. When the remaining capacity of the second battery 23 is determined to be smaller than or equal to the first lever battery threshold, step S22 is performed. In, step S22, at least one of gear positions of the derailleur 10 is invalided and non-selectable by the derailleur 10.

After step S22, step S23 is performed. Step S23 is to determine whether the remaining capacity of the second battery 23 is smaller than or equal to a second lever battery threshold. When the remaining capacity of the second battery 23 is determined to be smaller than or equal to the second lever battery threshold, step S24 is performed. The step S24 is to fix the derailleur 10 in the current gear position so as to invalid the gear shifting of the derailleur 10.

In the step S23, when the remaining capacity of the second battery 23 is determined to be larger than the second lever battery threshold, step S25. In step S25, the derailleur 10 is allowed to be shifted to another one of the gear positions that is not invalided and non-selectable by the derailleur 10.

In the step S21, when the remaining capacity of the second battery 23 is determined to be larger than the first lever battery threshold, step S26 is performed. In step S26, the derailleur 10 is shiftable among all of the gear positions.

According to the methods for controlling a derailleur in low battery remaining capacity discussed in the above embodiments of the disclosure, when the remaining capacity of the first battery is smaller than or equal to the first derailleur battery threshold, or the remaining capacity of the second battery is smaller than or equal to the first lever battery threshold, the highest gear may be the gear position that is not allowed to be selected. As such, it can prevent the derailleur from shifting to the highest gear when the remaining capacity of the first battery is about to be insufficient for gear shifting or the remaining capacity of the second battery is about to be insufficient for signal transmission of the wireless transceiver. As a result, even if the remaining capacity of the first battery or the second battery drops to a lower level, the rider is prevented from selecting the highest gear, thus avoiding the situation of high-load pedaling.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A method for controlling a derailleur in low battery remaining capacity, the method comprising:
   determining whether a remaining capacity of a first battery of the derailleur is smaller than or equal to a first derailleur battery threshold;
   when the remaining capacity of the first battery is determined to be smaller than or equal to the first derailleur battery threshold, at least one of gear positions of the derailleur is invalided and non-selectable by the derailleur;
   wherein after the at least one of the gear positions of the derailleur is invalided and non-selectable by the derailleur, the method further comprises:
   determining whether the remaining capacity of the first battery is smaller than or equal to a second derailleur battery threshold, wherein the second derailleur battery threshold is smaller than the first derailleur battery threshold;
   when the remaining capacity of the first battery is determined to be larger than the second derailleur battery threshold, the derailleur is allowed to be shifted to another one of the gear positions that is not invalided and non-selectable by the derailleur.

2. The method according to claim 1, wherein:
   when the remaining capacity of the first battery is determined to be smaller than or equal to the second derailleur battery threshold, the derailleur is fixed in one of the gear positions where the derailleur is currently located to prevent the derailleur from being shifted to another one of the gear positions.

3. The method according to claim 1, wherein when the remaining capacity of the first battery is larger than the first derailleur battery threshold, the derailleur is shiftable among all of the gear positions.

4. The method according to claim 1, further comprising:
   determining whether a remaining capacity of a second battery of a shift lever is smaller than or equal to a first lever battery threshold;
   when the remaining capacity of the first battery is determined to be smaller than or equal to the first derailleur battery threshold, or the remaining capacity of the second battery is smaller than or equal to the first lever battery threshold, the at least one of the gear positions of the derailleur is invalided and non-selectable by the derailleur; and
   when the remaining capacity of the first battery is larger than the first derailleur battery threshold, and the remaining capacity of the second battery is larger than the first lever battery threshold, the derailleur is shiftable among all of the gear positions.

5. The method according to claim 4, wherein after the at least one of the gear positions of the derailleur is invalided and non-selectable by the derailleur, the method further comprises:
   determining whether the remaining capacity of the second battery is smaller than or equal to a second lever battery threshold, wherein the second lever battery threshold is smaller than the first lever battery threshold;
   when the remaining capacity of the first battery is smaller than or equal to the second derailleur battery threshold, or the remaining capacity of the second battery is smaller than or equal to the second lever battery threshold, the derailleur is fixed in one of the gear positions where the derailleur is currently located to prevent the derailleur from being shifted to another one of the gear positions; and
   when the remaining capacity of the first battery is larger than the second derailleur battery threshold, and the remaining capacity of the second battery is larger than the second lever battery threshold, the derailleur is allowed to be shifted to another one of the gear positions that is not invalided and non-selectable by the derailleur.

6. The method according to claim 4, wherein the shift lever is in wireless communication with the derailleur.

7. The method according to claim 1, wherein the derailleur is a front derailleur corresponding to a plurality of chain rings, each of the plurality of chain rings corresponds to at least two of the gear positions; when the remaining capacity of the first battery is smaller than or equal to the first derailleur battery threshold, the at least two of the gear positions corresponding to one of the plurality of chain rings are invalided and non-selectable by the derailleur.

8. A method for controlling a derailleur in low battery remaining capacity, the method comprising:
   determining whether a remaining capacity of a battery of a shift lever is smaller than or equal to a first lever battery threshold;
   when the remaining capacity of the battery is determined to be smaller than or equal to the first lever battery threshold, at least one of gear positions of the derailleur is invalided and non-selectable by the derailleur;
   wherein after the at least one of the gear positions of the derailleur is invalided and non-selectable by the derailleur, the method further comprises:
   determining whether the remaining capacity of the battery is smaller than or equal to a second lever battery threshold, wherein the second lever battery threshold is smaller than the first lever battery threshold;
   when the remaining capacity of the battery is determined to be larger than the second lever battery threshold, the derailleur is allowed to be shifted to another one of the gear positions that is not invalided and non-selectable by the derailleur.

9. The method according to claim 8, wherein:
   when the remaining capacity of the battery is determined to be smaller than or equal to the second lever battery threshold, the derailleur is fixed in one of the gear positions where the derailleur is currently located to prevent the derailleur from being shifted to another one of the gear positions.

10. The method according to claim 8, wherein when the remaining capacity of the battery is determined to be larger than the first lever battery threshold, the derailleur is shiftable among all of the gear positions.

11. The method according to claim 8, wherein the shift lever is in wireless communication with the derailleur.

12. The method according to claim 8, wherein the derailleur is a front derailleur corresponding to a plurality of chain rings, each of the plurality of chain rings corresponds to at least two of the gear positions of the derailleur; when the remaining capacity of the battery is smaller than or equal to the first lever battery threshold, the at least two of the gear positions corresponding to one of the plurality of chain rings are invalided and non-selectable by the derailleur.

13. A method for controlling a derailleur in low battery remaining capacity, the method comprising:
   determining whether a remaining capacity of a first battery of the derailleur is smaller than or equal to a first derailleur battery threshold, and determining whether a remaining capacity of a second battery of a shift lever is smaller than or equal to a first lever battery threshold;
   when the remaining capacity of the first battery is smaller than or equal to the first derailleur battery threshold, or the remaining capacity of the second battery is smaller than or equal to the first lever battery threshold, the shift lever does not send a gear shifting signal to the derailleur, or the derailleur is unresponsive to the gear shifting signal sent by the shift lever, and then the method further comprises:
   determining whether the remaining capacity of the first battery is smaller than or equal to a second derailleur battery threshold and determining whether the remaining capacity of the second battery is smaller than or equal to a second lever battery threshold, wherein the second derailleur battery threshold is smaller than the first derailleur battery threshold, and the second lever battery threshold is smaller than the first lever battery threshold;
   when the remaining capacity of the first battery is determined to be larger than the second derailleur battery threshold, and the remaining capacity of the second battery is larger than the second lever battery threshold, the derailleur is allowed to be shifted to another one of gear positions that is not invalided and non-selectable by the derailleur.

14. The method according to claim 13, wherein the gear shifting signal is a signal that shifts the derailleur to a specific gear position.

* * * * *